(12) United States Patent
Nako et al.

(10) Patent No.: US 12,012,897 B2
(45) Date of Patent: Jun. 18, 2024

(54) JET ENGINE

(71) Applicant: MITSUBISHI HEAVY INDUSTRIES, LTD., Tokyo (JP)

(72) Inventors: Shotaro Nako, Tokyo (JP); Takuto Haniu, Tokyo (JP); Tomohisa Wada, Tokyo (JP); Shojiro Furuya, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 61 days.

(21) Appl. No.: 17/263,997

(22) PCT Filed: Jan. 15, 2020

(86) PCT No.: PCT/JP2020/001067
§ 371 (c)(1),
(2) Date: Jan. 28, 2021

(87) PCT Pub. No.: WO2020/170657
PCT Pub. Date: Aug. 27, 2020

(65) Prior Publication Data
US 2021/0293182 A1      Sep. 23, 2021

(30) Foreign Application Priority Data

Feb. 18, 2019   (JP) .................. 2019-026290

(51) Int. Cl.
*F02C 7/224*  (2006.01)
*F02C 7/26*   (2006.01)
(Continued)

(52) U.S. Cl.
CPC ............ *F02C 7/224* (2013.01); *F02C 7/26* (2013.01); *F02C 9/44* (2013.01); *F02K 7/10* (2013.01);
(Continued)

(58) Field of Classification Search
CPC .............. F02C 7/224; F02C 7/26; F02K 7/10
See application file for complete search history.

(56) References Cited

U.S. PATENT DOCUMENTS 2,907,527 A * 10/1959 Cummings ............. F23D 11/22
                                                    60/736
3,017,745 A *  1/1962 Shirley .................... F02K 9/56
                                                    60/39.27
(Continued)

FOREIGN PATENT DOCUMENTS

JP   2003-018900   1/2003
JP   2007-120316   5/2007
(Continued)

OTHER PUBLICATIONS

JP 2016183574 machine translation (downloaded Aug. 2022) (Year: 2022).*

(Continued)

*Primary Examiner* — Ted Kim
(74) *Attorney, Agent, or Firm* — Wenderoth, Lind & Ponack, L.L.P.

(57) ABSTRACT

A jet engine is provided which can efficiently pressurize fuel. A jet engine 2 includes a pump 110 that heats fuel, a heating conduit 120 that heats the pressurized fuel, a fuel turbine 130 that provides mechanical power to the pump, and an electric rotating machine 140. When a given condition is not satisfied, the electric rotating machine 140 provides mechanical power to the fuel turbine 130. When the given condition is satisfied, the fuel that has passed through the heating conduit 120 before combustion flows into the fuel turbine 130 to provide mechanical power to the fuel turbine 130.

9 Claims, 4 Drawing Sheets

(51) Int. Cl.
    *F02C 9/44*         (2006.01)
    *F02K 7/10*         (2006.01)
(52) U.S. Cl.
    CPC ...... *F05D 2220/80* (2013.01); *F05D 2240/36* (2013.01); *F05D 2270/304* (2013.01)

(56) References Cited

U.S. PATENT DOCUMENTS

| | | | | |
|---|---|---|---|---|
| 3,241,311 | A * | 3/1966 | Kuhrt | F02C 7/224 |
| | | | | 60/269 |
| 3,358,559 | A * | 12/1967 | Grandy | F42B 15/04 |
| | | | | 244/3.12 |
| 3,690,100 | A * | 9/1972 | Wolf | F02C 7/224 |
| | | | | 60/206 |
| 4,934,136 | A * | 6/1990 | Weigand | F02C 7/277 |
| | | | | 60/773 |
| 5,129,599 | A | 7/1992 | Wollen | |
| 5,161,365 | A | 11/1992 | Wright | |
| 5,752,380 | A | 5/1998 | Bosley et al. | |
| 6,836,086 | B1 * | 12/2004 | Goldberg | F02C 7/26 |
| | | | | 318/140 |
| 2007/0006594 | A1 | 1/2007 | Bakos et al. | |
| 2007/0175222 | A1 | 8/2007 | Donohue et al. | |
| 2009/0212570 | A1 * | 8/2009 | Le | F03D 9/28 |
| | | | | 60/641.15 |
| 2012/0047872 | A1 * | 3/2012 | Sharpe | F02K 9/52 |
| | | | | 60/227 |
| 2013/0234506 | A1 * | 9/2013 | Langford | F02C 7/32 |
| | | | | 307/9.1 |
| 2015/0248375 | A1 | 9/2015 | Houel et al. | |
| 2015/0315971 | A1 | 11/2015 | Reitz et al. | |
| 2015/0344144 | A1 | 12/2015 | Kamath et al. | |
| 2015/0354504 | A1 | 12/2015 | Kawamata et al. | |
| 2016/0084173 | A1 * | 3/2016 | Haughton | F01N 5/04 |
| | | | | 60/273 |
| 2016/0169112 | A1 | 6/2016 | Morioka et al. | |
| 2017/0175680 | A1 | 6/2017 | Romet et al. | |
| 2019/0032605 | A1 | 1/2019 | Sakaguchi et al. | |

FOREIGN PATENT DOCUMENTS

| | | |
|---|---|---|
| JP | 2007-205353 | 8/2007 |
| JP | 2014-159769 | 9/2014 |
| JP | 2015-47902 | 3/2015 |
| JP | 2015-114488 | 6/2015 |
| JP | 2015-532485 | 11/2015 |
| JP | 2016-510376 | 4/2016 |
| JP | 2016-183574 | 10/2016 |
| JP | 2017-524851 | 8/2017 |
| WO | 2018/051566 | 3/2018 |

OTHER PUBLICATIONS

International Search Report dated Mar. 24, 2020 in International (PCT) Application No. PCT/JP2020/001067.
English translation of the International Preliminary Report on Patentability dated Aug. 26, 2021 in International Application No. PCT/JP2020/001067.
Examination Report No. 1 dated Feb. 2, 2022 in corresponding Australian Patent Application No. 2020224417.
Office Action dated Jan. 31, 2023 in corresponding Japanese Patent Application No. 2019-026290, with English translation, 8 pages.
Office Action dated Jul. 11, 2023 in corresponding Japanese Patent Application No. 2019-026290, with English translation, 10 pages.
Office Action issued Dec. 19, 2023 in corresponding Japanese Patent Application No. 2019-026290, with English translation (9 pages).

* cited by examiner

JET ENGINE

TECHNICAL FIELD

The present invention relates to jet engines.

BACKGROUND ART

A jet engine such as a ramjet engine may inject fuel into a combustor that combusts the fuel with a high injection pressure. For example, patent literature 1 discloses a method for pressurizing fuel with a turbine pump. This turbine pump is operated by supplying pressurized air compressed by a turbine engine into the turbine pump. This document also describes that electric power may be extracted from the turbine pump by incorporating a generator in the turbine pump. This document further describes that the pressurized air from the turbine engine can be reduced by incorporating an electric powered motor in the turbine pump.

CITATION LIST

Patent Literature

[Patent Literature 1] JP 2016-510376 A

SUMMARY OF THE INVENTION

This invention is made under the above-described circumstances, and one of objectives is to provide a jet engine that can efficiently pressurize fuel. Other objectives would be understandable from the following recitations and descriptions of embodiments.

A jet engine for achieving the above-described objective in accordance with one embodiment includes a pump that pressurizes fuel, a heating conduit that heats the pressurized fuel, a fuel turbine that provide mechanical power to the pump, and an electric rotating machine. When a given condition is not satisfied, the electric rotating machine provides mechanical power to the fuel turbine. When the given condition is satisfied, the fuel that has passed through the heating conduit before combustion flows into the fuel turbine to provide mechanical power to the fuel turbine.

The present invention allows efficiently pressurize fuel of a jet engine.

DESCRIPTION OF EMBODIMENTS

Figure 1:
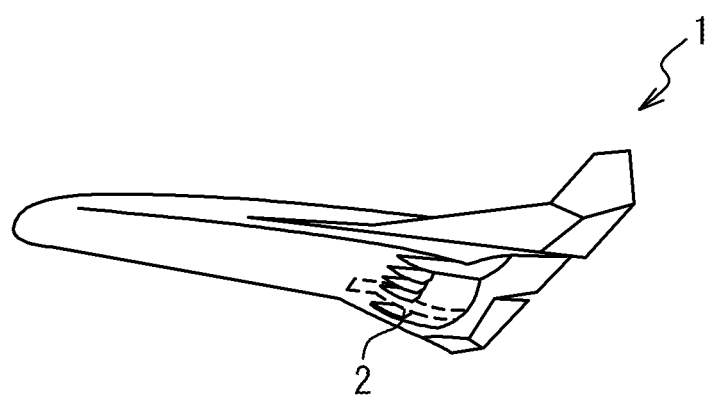
FIG. 1 is a schematic diagram of a body including a jet engine, according to one embodiment.
Figure 2:
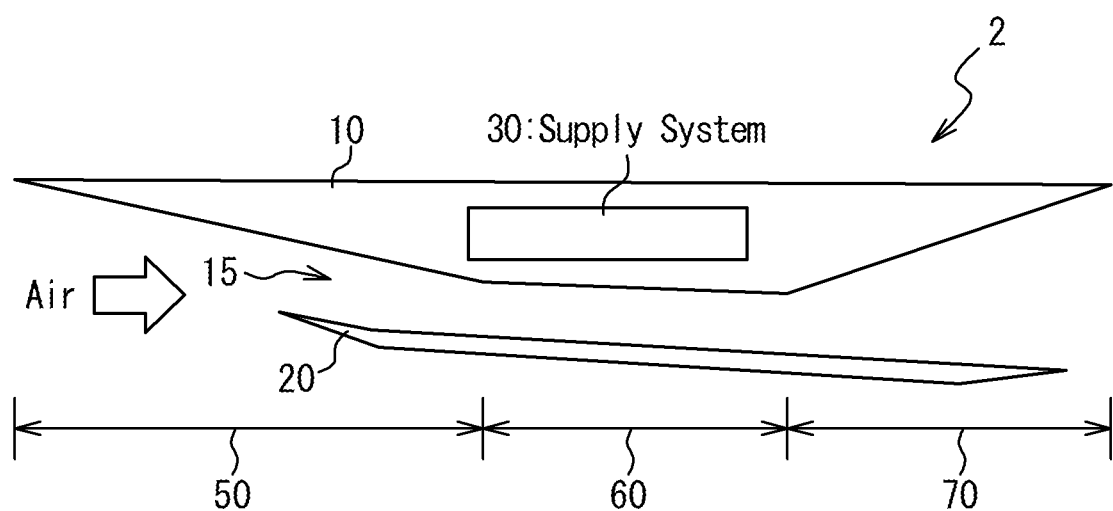
FIG. 2 is a schematic diagram illustrating a cross section of the jet engine, according to one embodiment.

A jet engine 2 according to one embodiment is installed, for example, on an aircraft 1 as illustrated in FIG. 1. The jet engine 2 may be installed on a flying body, including a missile and the like. As illustrated in FIG. 2, the jet engine 2 includes, for example, a body 10, a cowl 20, and a supply system 30. Gas-flowable space 15 is disposed between the body 10 and the cowl 20. The body 10 and the cowl 20 forms an inlet 50 that introduces air into the space 15 as the aircraft 1 moves forward. Fuel is injected into a center portion of the space 15 from the supply system 30, where a combustor 60 is formed in which fuel is mixed with air and combusted. Combustion gas is ejected from a nozzle 70 formed by the body 10 and the cowl 20. The jet engine 2 acquires thrust force by taking air in from the inlet 50 and ejecting the combustion gas from the nozzle 70. The jet engine 2 includes, for example, a ramjet engine.

Figure 3:
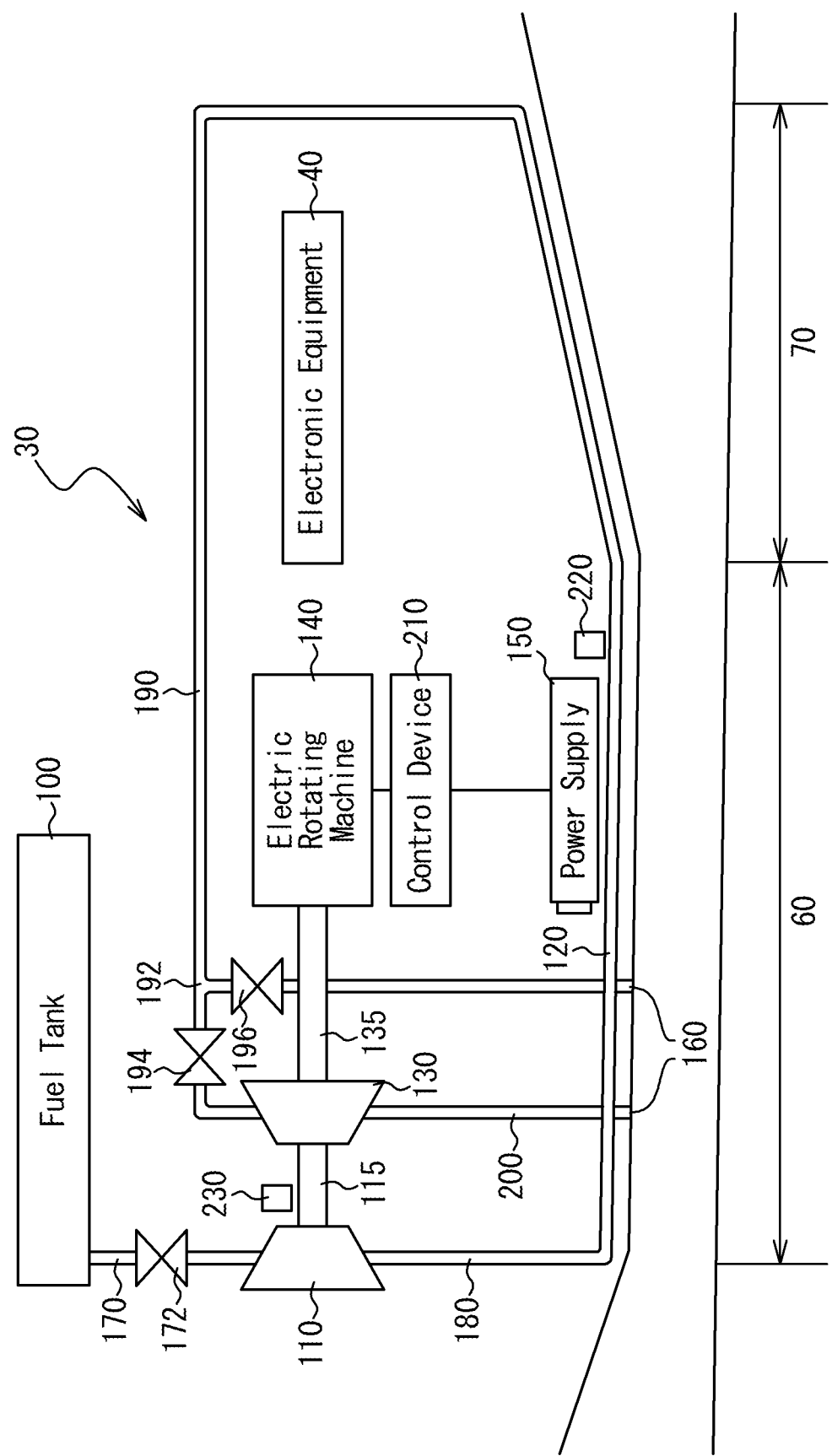
FIG. 3 is a schematic diagram of a supply system of the jet engine, according to one embodiment.

As illustrated in FIG. 3, the supply system 30 includes a fuel tank 100, a pump 110, a heating conduit 120, a fuel turbine 130, an electric rotating machine 140, a power supply 150, and injection ports 160. Fuel is stored in the fuel tank 100.

The electric rotating machine 140 provide mechanical power to the pump 110 at startup of the jet engine 2. The electric rotating machine 140 is coupled to a pump shaft 115 of the pump 110 via a fuel turbine shaft 135 of the fuel turbine 130. The electric rotating machine 140 is supplied with electric power from the power supply 150 to provide mechanical power to the fuel turbine 130 by rotating the fuel turbine shaft 135. The rotation of the fuel turbine shaft 135 causes the pump shaft 115 to rotate. The rotation of the pump shaft 115 allows the pump 110 to pressurize fuel supplied from the fuel tank 100. The pressurized fuel passes through the heating conduit 120 and is injected into the combustor 60 from the injection ports 160.

When the combustor 60 reaches high temperature, the fuel turbine 130 provides mechanical power to the pump 110. The heating conduit 120 heats and vaporizes fuel flowing through the heating conduit 120 as the heat generated in the combustor 60 is transported to the heating conduit 120. The vaporized fuel flows into the fuel turbine 130 to provide mechanical power to the fuel turbine 130 before being combusted in the combustor 60, rotating the fuel turbine shaft 135 of the fuel turbine 130. With the fuel turbine shaft 135 coupled to the pump shaft 115, the rotational force generated by the fuel turbine 130 rotates the pump shaft 115 of the pump 110. The rotation of the pump shaft 115 causes the pump 110 to pressurize the fuel. The fuel ejected from the fuel turbine 130 is injected into the combustor 60 from the injection port 160.

As thus described, the pump 110 acquires mechanical power from the electric rotating machine 140 when the temperature of the heating conduit 120 is low and acquires mechanical power from the fuel turbine 130 when the temperature of the heating conduit 120 is high. Through this operation, the pump 110 can apply sufficient pressure to the fuel when the temperature of the heating conduit 120 is low.

Additionally, when the temperature of the heating conduit 120 is high, the electric rotating machine 140 generates electric power as the fuel turbine 130 rotates the rotor of the electric rotating machine 140. The electric power generated by the electric rotating machine 140 is supplied to electronic equipment 40 installed on the aircraft 1.

As thus described, power consumption of the power supply 150 can be reduced as the electric rotating machine 140 supplies electric power. The power supply 150 may include a thermal battery, a molten salt battery, or the like. The power supply 150 may be disposed adjacent to the combustor 60 or the heating conduit 120. Heat generated in the combustor 60 is transported to the power supply 150. This may lengthen the operating time duration of the power supply 150 as the power supply 150 is kept warm.

A description is then given of the flow of fuel in the supply system 30. The supply system 30 includes: a first conduit 170 that connects the fuel tank 100 and the pump 110; a second conduit 180 that connects the pump 110 and the heating conduit 120; a third conduit 190 that connects the heating conduit 120, an injection port 160, and the fuel turbine 130; and a fourth conduit 200 that connects the fuel turbine 130 and an injection port 160. The number of the injection ports 160 may be plural.

The first conduit 170 introduces the fuel stored in the fuel tank 100 to the pump 110 at startup of the jet engine 2. A shutoff valve 172 is disposed on the first conduit 170. Fuel flows into the pump 110 as the shutoff valve 172 is opened at startup of the jet engine 2. The fuel that enters the pump 110 is pressurized and ejected to the second conduit 180. The pump 110 includes a centrifugal pump, such as a turbine pump.

The second conduit 180 introduces the fuel pressurized by the pump 110 into the heating conduit 120. The fuel introduced into the heating conduit 120 is heated in the heating conduit 120 and flows into the third conduit 190. The heating conduit 120 is disposed, for example, adjacent to the combustor 60. Alternatively, the heating conduit 120 may be disposed adjacent to the nozzle 70.

The third conduit 190 introduces the fuel to an injection port 160 or the fuel turbine 130 depending on the temperature of the heating conduit 120. The third conduit 190 has a branching point 192 at which the third conduit 190 is branched into a conduit that introduces the fuel from the heating conduit 120 to the injection port 160 and a conduit that introduces the fuel from the heating conduit 120 to the fuel turbine 130. A first on-off valve 194 is disposed between the branching point 192 and the fuel turbine 130, and a second on-off valve 196 is disposed between the branching point 192 and the injection port 160. When the temperature of the heating conduit 120 is low, the first on-off valve 194 is closed and the second on-off valve 196 is opened. This results in that the fuel that has passed through the heating conduit 120 flows to the injection port 160 without passing through the fuel turbine 130 and is injected into the combustor 60 from the injection port 160 to be combusted. When the temperature of the heating conduit 120 is high, the first on-off valve 194 is opened and the second on-off valve 196 is closed. This results in that the fuel that has passed through the heating conduit 120 flows into the fuel turbine 130.

The fuel introduced into the fuel turbine 130 rotates the fuel turbine shaft 135 and is then ejected to the fourth conduit 200.

The fourth conduit 200 introduces the fuel ejected from the fuel turbine 130 to the injection port 160. The fuel introduced to the injection port 160 is injected from the injection port 160 to be combusted.

To control the flow of the fuel, the supply system 30 includes, for example, a control device 210, a temperature sensor 220, and a tachometer 230.

The temperature sensor 220 measures the temperature of the heating conduit 120 and send temperature information indicative of the measured temperature to the control device 210.

The tachometer 230 measures the rotational speed of the pump shaft 115 and send rotation information indicative of the measured rotational speed to the control device 210. The tachometer 230 may estimate the rotational speed of the pump shaft 115 by measuring the rotational speed of the fuel turbine shaft 135.

The control device 210 controls the shutoff valve 172, the first on-off valve 194, and the second on-off valve 196. The control device 210 controls the first on-off valve 194 and the second on-off valve 196 based on the temperature measured by the temperature sensor 220.

The control device 210 further controls the electric rotating machine 140. At startup of the jet engine 2, the control device 210 operates the electric rotating machine 140 as a motor to allow the pump 110 to pressurize the fuel by supplying electric power to the electric rotating machine 140. Further, when the temperature of the heating conduit 120 is high, the control device 210 operates the electric rotating machine 140 as a generator to generate electric power from mechanical power of the fuel turbine 130.

The control device 210 may additionally control the rotational speed of the electric rotating machine 140 in response to the rotational speed measured by the tachometer 230. The pressure applied to the fuel by the pump 110 is determined by the rotational speed of the pump shaft 115. Accordingly, the control device 210 controls the electric rotating machine 140 to decrease the rotational speed of the electric rotating machine 140 when the rotational speed of the pump shaft 115 is high. Correspondingly, the control device 210 controls the electric rotating machine 140 to increase the rotational speed of the electric rotating machine 140 when the rotational speed of the pump shaft 115 is low. This allows controlling the pressure of the fuel ejected from the pump 110.

Figure 4:
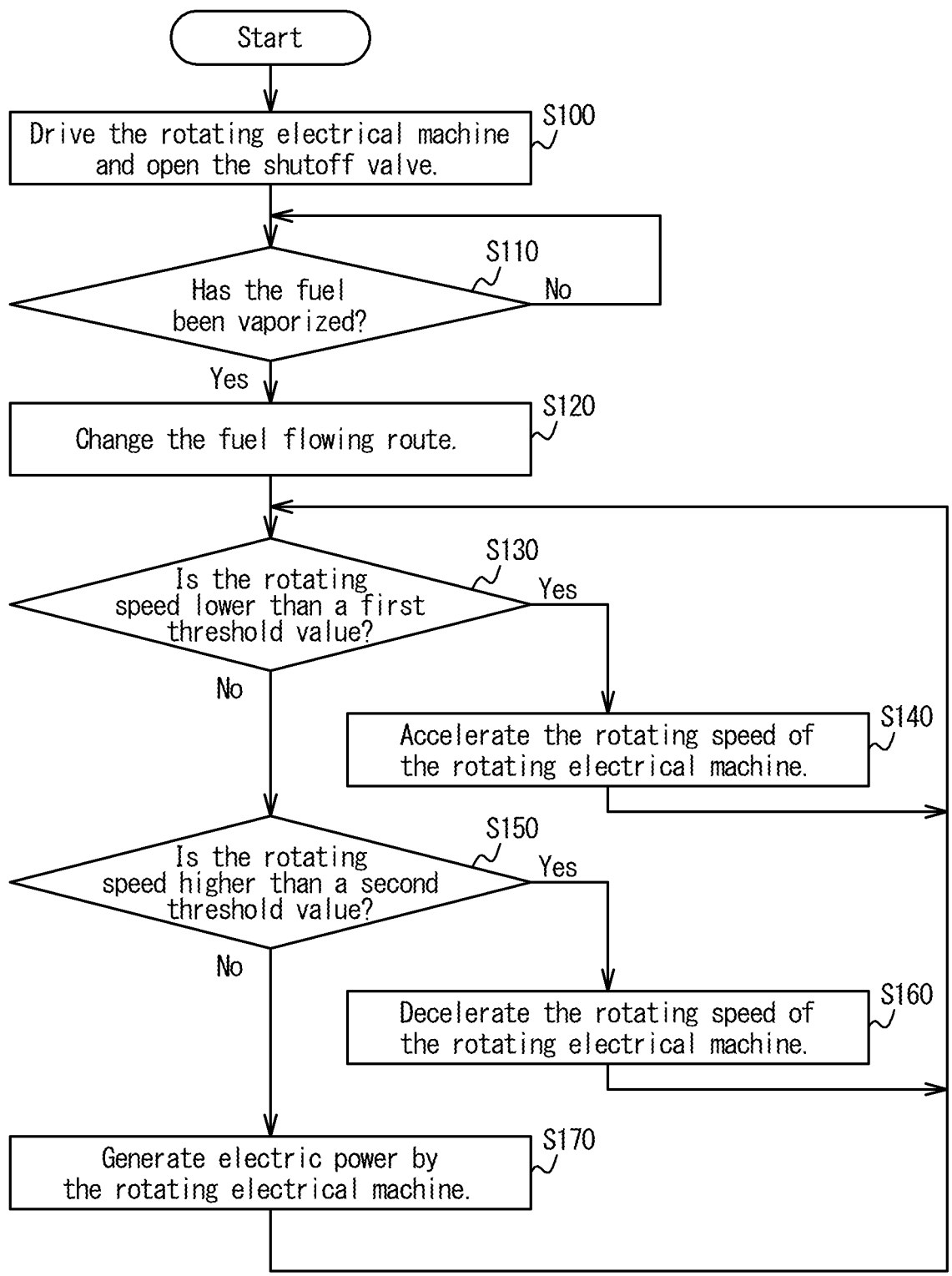
FIG. 4 is a flowchart related to processes of the supply system of the jet engine, according to one embodiment.

The jet engine 2 operates as illustrated in FIG. 4. Before startup of the jet engine 2, the shutoff valve 172 and the first on-off valve 194 are closed and the second on-off valve 196 is opened.

At startup of the jet engine 2, the electric rotating machine 140 is operated as a motor and the shutoff valve 172 is opened (step S100). The control device 210 opens the shutoff valve 172 to provide the fuel in the fuel tank 100 to the pump 110. The control device 210 further supplies electric power to the electric rotating machine 140 to allow the pump 110 to pressurize the fuel. The second on-off valve 196 may be opened at the startup of the jet engine 2.

At step S110, the control device 210 determines, based on the temperature of the heating conduit 120 measured by the temperature sensor 220, whether the fuel heated by the heating conduit 120 is vaporized. For example, the control device 210 determines that the fuel flowing through the heating conduit 120 is vaporized when the temperature of the heating conduit 120 is higher than a given temperature. The control device 210 waits until the fuel flowing through the heating conduit 120 is determined as being vaporized. The procedure goes to step S120 when the control device 210 determines that the fuel flowing through the heating conduit 120 is vaporized.

At step S120, the control device 210 changes the route along which the fuel flows by controlling the first on-off valve 194 and the second on-off valve 196. The control device 210 opens the first on-off valve 194 when determining that the fuel heated by the heating conduit 120 is vaporized. The control device 210 then closes the second on-off valve 196. This causes the fuel heated by the heating conduit 120 to flow into the fuel turbine 130, rotating the fuel turbine shaft 135. The rotation of the fuel turbine shaft 135 causes rotation of the pump shaft 115 of the pump 110. As a result, the pump 110 pressurizes the fuel.

At step S130, the control device 210 determines whether the rotational speed of the pump shaft 115 measured by the tachometer 230 is lower than a first threshold value. When the rotational speed of the pump shaft 115 is lower than the first threshold value, this implies that the pressure of the fuel ejected from the pump 110 is low. Accordingly, the control device 210 controls the electric rotating machine 140 to increase the rotational speed of the electric rotating machine 140 when the control device 210 determines that the rotational speed of the pump shaft 115 is lower than the first threshold value (step S140). The control device 210 goes back to the process of step S130 after completing the process of step S140. When the rotational speed of the pump shaft 115 is higher than or equal to the first threshold value, the procedure goes to step S150. The first threshold value may be determined based on the lower limit of the fuel pressure allowed for the jet engine 2. The first threshold value may be determined in response to the velocity of the aircraft 1. In this case, the supply system 30 acquires the velocity of the aircraft 1 from a speedometer disposed on the aircraft 1. Alternatively, the supply system 30 may include a speedometer.

At step S150, the control device 210 determines whether the rotational speed of the pump shaft 115 measured by the tachometer 230 is higher than a second threshold value. When the rotational speed of the pump shaft 115 is higher than the second threshold value, this implies that the pressure of the fuel ejected from the pump 110 is high. Accordingly, the control device 210 controls the electric rotating machine 140 to decrease the rotational speed of the electric rotating machine 140 when the control device 210 determines that the rotational speed of the pump shaft 115 is higher than the second threshold value (step S160). The control device 210 goes back to the process of step S130 after completing the process of step S160. When the rotational speed of the pump shaft 115 is lower than or equal to the second threshold value, the procedure goes to step S170. The second threshold value may be determined based on the upper limit of the fuel pressure allowed for the jet engine 2. The second threshold value may be determined in response to the velocity of the aircraft 1. For example, the second threshold value may be larger than the first threshold value.

At step S170, the control device 210 operates the electric rotating machine 140 as a generator and supplies electric power generated by the electric rotating machine 140 to the electronic equipment 40. For example, the control device 210 receives the electric power generated by the electric rotating machine 140 and supplies the received electric power to the electronic equipment 40. The electric power generated by the electric rotating machine 140 may be directly supplied to the electronic equipment 40. At steps S140 and S160, the control device 210 may supply electric power supplied from the power supply 150 to the electronic equipment 40.

The control device 210 can adjust the fuel pressure by repeating steps S130 to S170.

The method for determining whether the fuel heated by the heating conduit 120 is vaporized may be arbitrarily selected at step 110. For example, the determination of whether the fuel is vaporized may be based on the temperature of the fuel flowing through the heating conduit 120 or the third conduit 190. In this case, the temperature sensor 220 measures the temperature of the fuel flowing through the heating conduit 120 or the third conduit 190. The control device 210 determines that the fuel is vaporized when the temperature of the fuel measured by the temperature sensor 220 is higher than a given value. The control device 210 may determine whether the fuel is vaporized based on the duration of time that has elapsed after the startup of the jet engine 2. In this case, the control device 210 determines that the fuel is vaporized when a given duration of time has elapsed after the startup of the jet engine 2. The control device 210 may determine whether the fuel heated by the heating conduit 120 is vaporized based on a combination of two or more of the temperature of the heating conduit 120, the temperature of the fuel flowing through the heating conduit 120, the temperature of the fuel flowing through the third conduit 190, and the duration of time that has elapsed after the startup of the jet engine 2.

The method for changing the route along which the fuel flows may be arbitrarily selected at step S120. For example, the control device 210 may open the first on-off valve 194 after closing the second on-off valve 196. The control device 210 may close the second on-off valve 196 and open the first on-off valve 194 at the same time. A three-way valve may be disposed at the branching point 192. The fuel that has passed through the heating conduit 120 is introduced to the injection port 160 or the fuel turbine 130 by controlling this three-way valve by the control device 210. In this case, the control device 210 controls the three-way valve such that the fuel that has passed through the heating conduit 120 flows to the injection port 160 when the temperature of the heating conduit 120 is low. The control device 210 controls the three-way valve such that the fuel that has passed through the heating conduit 120 flows to the fuel turbine 130 when the temperature of the heating conduit 120 is high.

Figure 5:
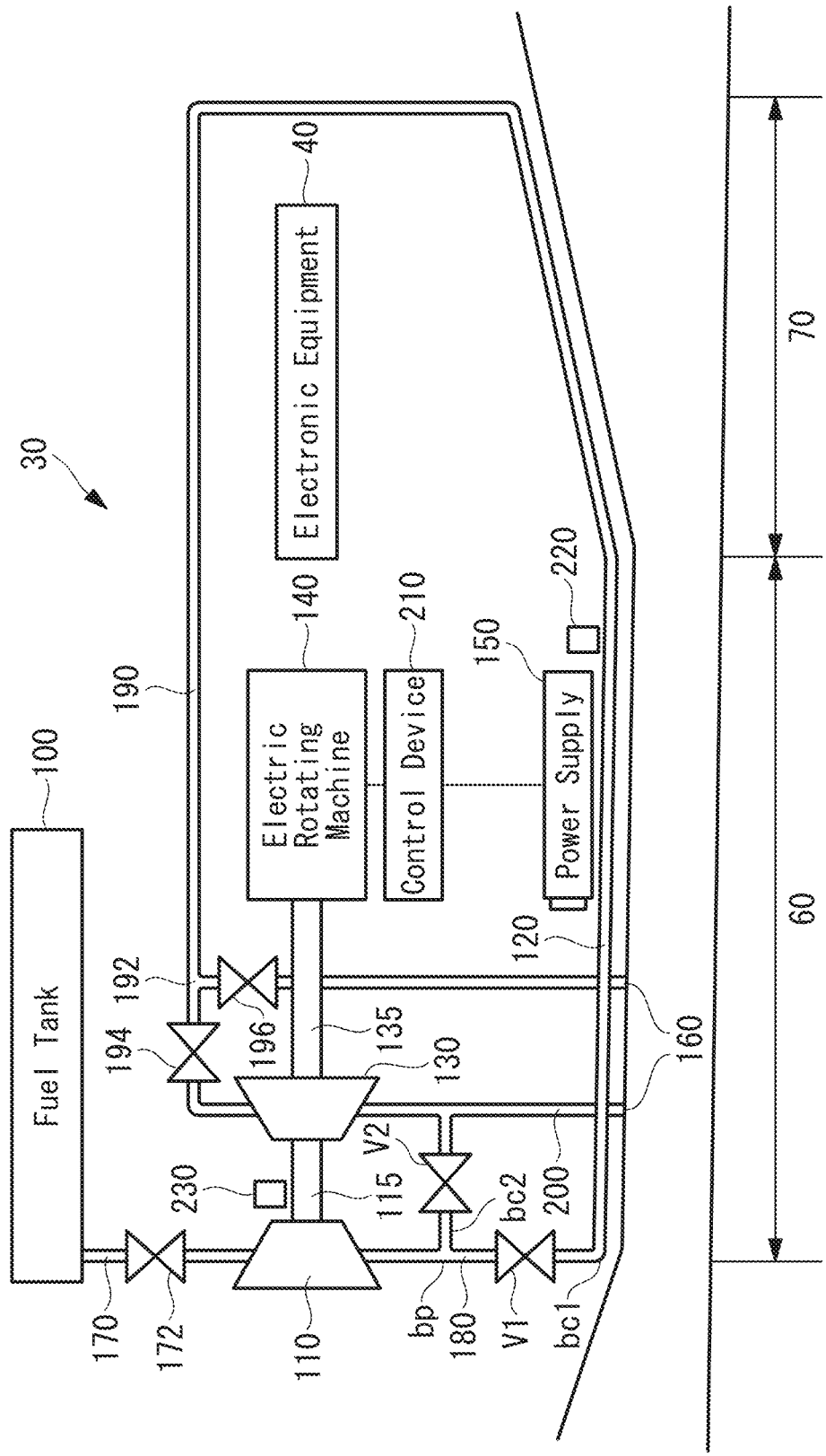
FIG. 5 is a schematic diagram of a supply system of the jet engine, according to one embodiment.

The method for injecting the fuel from the injection port 160 when the temperature of the heating conduit 120 is low may be arbitrarily selected. For example, the fuel may be introduced from the second conduit 180 to the injection port 160 without passing through the heating conduit 120 when the temperature of the heating conduit 120 is low. In this case, as shown in FIG. 5, the second conduit 180 has a branching point bp at which the second conduit 180 is branched into a first branching conduit bc1 that introduces the fuel from the pump 110 to the heating conduit 120 and a second branching conduit bc2 that introduces the fuel from the pump 110 to the injection port 160. A third on-off valve V1 is disposed between this branching point bp and the heating conduit 120, and a fourth on-off valve V2 is disposed between this branching point bp and the injection port 160. The control device 210 controls the third on-off valve V1 and the fourth on-off valve V2 in a similar manner as the first on-off valve 194 and the second on-off valve 196. The fuel may be unconditionally provided to the injection port 160 via the fuel turbine 130 without disposing the branching point 192 on the third conduit 190.

Although the present invention has been described above with reference to embodiments and examples, the present invention is not limited to the above-described embodiments and examples. The configurations and details of the present invention can be arbitrarily changed or modified by persons skilled in the art in various ways within the scope of the technical ideas of the present invention set forth in the claims. For example, the processes described in the above are mere one example, and the order and contents of the processes of the respective steps may be changed as long as the functionalities are not disturbed. The described configurations may be arbitrarily modified as long as the functionalities are not disturbed. For example, the pump shaft 115 of the pump 110 may be coupled to the fuel turbine shaft 135 of the fuel turbine 130 in an arbitrary way as long as mechanical power is transmitted to the fuel turbine shaft 135. The fuel turbine shaft 135 of the fuel turbine 130 may be coupled to the electric rotating machine 140 in an arbitrary way as long as mechanical power is transmitted to the electric rotating machine 140. The control device 210 may not control the electric rotating machine 140 in response to the rotational speed of the pump shaft 115. In this case, steps S130 to S160 in FIG. 4 may be omitted.

This application claims priority on Japanese patent application No. 2019-026290, filed on Feb. 18, 2019, the disclosure of which is incorporated herein by reference in its entirety.

The invention claimed is:

1. A jet engine, comprising:
a pump that pressurizes fuel;
a combustor that combusts the fuel;
a heating conduit that heats the pressurized fuel, wherein the heating conduit is disposed adjacent to the combustor;
a fuel turbine that provides mechanical power to the pump, the fuel turbine receiving fuel from the heating conduit, a sensor sensing temperature in the heating conduit;
an electric rotating machine mechanically coupled to the fuel turbine;
a tachometer that measures a rotational speed of the fuel turbine;
a control device that controls a rotational speed of the electric rotating machine in response to the rotational speed of the fuel turbine;
a power supply that supplies electric power to the electric rotation machine; and
a combustor that combusts the fuel;
an injection port serving as an opening that injects the fuel to the combustor, the injection port receiving fuel from the fuel turbine via a fuel injection conduit;
a fuel introduction conduit having a branching point at which a first branch conduit and a second branch conduit are branched, the first branch conduit introducing the fuel from the pump to the heating conduit and the second branch conduit introducing the fuel from the pump to the fuel injection conduit and the injection port without passing through the heating conduit;
a first on-off valve provided between the branching point and the heating conduit and a second on-off valve provided between the branching point and the injection port,
wherein the electric rotating machine provides mechanical power to the fuel turbine when a given condition is not satisfied,
wherein the fuel that has passed through the heating conduit before combustion flows into the fuel turbine to provide mechanical power to the fuel turbine when the given condition is satisfied,
wherein the control device controls the electric rotating machine so as to provide mechanical power to decrease the rotational speed of the fuel turbine when the rotational speed of the fuel turbine is higher than a first threshold value,
wherein the heating conduit is disposed adjacent to the combustor, and
wherein the power supply is a thermal battery, the thermal battery being disposed adjacent to the heating conduit and being kept warm by heat generated by the combustor and
wherein the control device closes the first on-off valve and opens the second on-off valve in response to a the sensed temperature in the heating conduit, and introduces the fuel from the pump to the injection port through the second branch conduit without passing through the heating conduit.

2. The jet engine according to claim 1, wherein the given condition includes an event in which the fuel that has passed through the heating conduit is vaporized.

3. The jet engine according to claim 1, wherein the given condition comprises an event in which a temperature of the heating conduit is higher than a predetermined temperature.

4. The jet engine according to claim 1, wherein the given condition comprises an event in which a temperature of the fuel that has passed through the heating conduit is higher than a predetermined temperature.

5. The jet engine according to claim 1, wherein the given condition comprises an event in which a given duration of time has elapsed after startup of the jet engine.

6. The jet engine according to claim 1, wherein the electric rotating machine receives a rotational force of the fuel turbine to generate electric power when the given condition is satisfied.

7. The jet engine according to claim 1, wherein the pump comprises a pump shaft and pressurizes the fuel in response to a rotational speed of the pump shaft,
wherein the fuel turbine comprises a fuel turbine shaft coupled to the pump shaft and provides the mechanical power to the pump by rotation of the fuel turbine shaft,
wherein the electric rotating machine comprises a rotor coupled to the fuel turbine shaft,
wherein the tachometer measures the rotational speed of the fuel turbine by measuring a rotational speed of the fuel turbine shaft,
wherein the control device controls the rotational speed of the electric rotating machine by controlling a rotational speed of the rotor of the electric rotating machine in response to the rotational speed of the fuel turbine shaft, and
wherein the control device decreases the rotational speed of the rotor of the electric rotating machine when the rotational speed of the fuel turbine is higher than the first threshold value.

8. The jet engine according to claim 7,
wherein the control device increases the rotational speed of the rotor of the fuel turbine when the rotational speed of the fuel turbine is lower than a second threshold value.

9. The jet engine according to claim 1, wherein the control device closes the first on-off valve and opens the second on-off valve when a temperature of the heating conduit is lower than a predetermined temperature, and introduces the fuel from the pump to the injection port without passing through the heating conduit.

* * * * *